United States Patent
Yamanaka et al.

(10) Patent No.: US 9,317,897 B2
(45) Date of Patent: Apr. 19, 2016

(54) SOLID-STATE IMAGING DEVICE, DRIVING METHOD FOR THE SAME, AND ELECTRONIC APPARATUS

(71) Applicant: Sony Corporation, Tokyo (JP)

(72) Inventors: Atsushi Yamanaka, Kanagawa (JP); Yasushi Saito, Saitama (JP); Daisuke Kawamata, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/338,731

(22) Filed: Jul. 23, 2014

(65) Prior Publication Data

US 2015/0029377 A1    Jan. 29, 2015

(30) Foreign Application Priority Data

Jul. 29, 2013   (JP) ................... 2013-156904

(51) Int. Cl.
| | |
|---|---|
| H04N 3/14 | (2006.01) |
| H04N 5/335 | (2011.01) |
| G06T 3/40 | (2006.01) |
| H04N 5/378 | (2011.01) |
| H04N 5/3745 | (2011.01) |

(52) U.S. Cl.
CPC .............. *G06T 3/4015* (2013.01); *H04N 5/378* (2013.01); *H04N 5/3745* (2013.01); *H04N 5/37455* (2013.01)

(58) Field of Classification Search
CPC ....... H04N 5/345; H04N 5/372; H04N 5/378; H04N 9/045; H04N 2209/04; H04N 2209/045; G06T 3/4015; G02B 5/201
USPC ......... 348/294–324; 250/208.1; 257/290–292
See application file for complete search history.

(56) References Cited

FOREIGN PATENT DOCUMENTS

| | | |
|---|---|---|
| JP | 2005-210218 | 8/2005 |
| JP | 2009-117979 | 5/2009 |
| JP | 2009117979 A * | 5/2009 |

* cited by examiner

*Primary Examiner* — Yogesh Aggarwal
(74) *Attorney, Agent, or Firm* — Michael Best & Friedrich LLP

(57) ABSTRACT

A solid-state imaging device includes a pixel array unit, a pixel drive unit, and a signal processing unit. The pixel array unit includes first pixels and second pixels, the first pixels corresponding to respective color components of a plurality of color components, the second pixels having luminance components as main components, the first pixels and the second pixels being arranged regularly in a matrix. The pixel drive unit is configured to drive the pixels arranged in the pixel array unit. The signal processing unit is configured to execute predetermined weighted addition processing and calculate a pixel value of an output image by using only pixel information acquired from the first pixels.

15 Claims, 12 Drawing Sheets

SOLID-STATE IMAGING DEVICE, DRIVING METHOD FOR THE SAME, AND ELECTRONIC APPARATUS

CROSS REFERENCE TO RELATED APPLICATIONS

This application claims the benefit of Japanese Priority Patent Application JP 2013-156904 filed Jul. 29, 2013, the entire contents of which are incorporated herein by reference.

BACKGROUND

The present disclosure relates to a solid-state imaging device, a driving method for the solid-state imaging device, and an electronic apparatus, and more particularly, to a solid-state imaging device, a driving method for the solid-state imaging device, and an electronic apparatus that are capable of performing appropriate signal processing complying with an image capturing state.

From the past, solid-state imaging devices such as a CCD (Charge Coupled Device) image sensor and a CMOS (Complementary Metal Oxide Semiconductor) image sensor have been widely used for digital still cameras and digital video cameras.

In those types of solid-state imaging devices, a technique of taking in as much light as possible while performing color separation using color filters is studied. As one method for the technique, there is a method of using W (white) pixels for obtaining luminance information, in addition to R (red) pixels, G (green) pixels, and B (blue) pixels for obtaining color information (see, for example, Japanese Patent Application Laid-open No. 2009-117979).

Further, in the solid-state imaging devices, the following technique is studied: signals are read out by thinning-out to reduce the number of substantive pixels, and thus read-out processing and the like are performed at high speed. For example, Japanese Patent Application Laid-open No. 2005-210218 discloses an image processing apparatus that performs read-out by thinning-out in the case of using a color filter array in which G pixels are arrayed in a checkered pattern and R pixels and B pixels are arrayed in the remaining part.

SUMMARY

Japanese Patent Application Laid-open No. 2009-117979 discloses the technique of using W pixels in order to obtain luminance information. However, this technique has a configuration capable of outputting signals according to only the order of a pixel array, and thus the signals are not read out by thinning-out. For that reason, the reading speed for pixels is slow and the frame rate is difficult to improve.

Further, in the case of adopting the color filter array disclosed in Japanese Patent Application Laid-open No. 2005-210218, the read-out of signals by thinning-out can be performed only in every other row because of the limit in image quality, and thus the read-out by thinning-out in two or more rows is not performed. If such read-out by thinning-out is performed, there is a possibility that the occurrence of moire becomes prominent because the width of thinning-out is large.

For such reasons, there is a demand for execution of appropriate signal processing complying with an image capturing state, in the case where a pixel array of pixels having luminance components as main components is used.

The present disclosure has been made in view of the circumstances as described above and it is desirable to execute appropriate signal processing complying with an image capturing state, in the case where a pixel array of pixels having luminance components as main components is used.

According to an embodiment of the present disclosure, there is provided a solid-state imaging device including a pixel array unit, a pixel drive unit, and a signal processing unit. The pixel array unit includes first pixels and second pixels, the first pixels corresponding to respective color components of a plurality of color components, the second pixels having luminance components as main components, the first pixels and the second pixels being arranged regularly in a matrix. The pixel drive unit is configured to drive the pixels arranged in the pixel array unit. The signal processing unit is configured to execute predetermined weighted addition processing and calculate a pixel value of an output image by using only pixel information acquired from the first pixels.

The signal processing unit may be configured to execute the weighted addition processing in at least one of a horizontal direction, a vertical direction, and an oblique direction.

The output image may include an image of a Bayer array, and the signal processing unit may be configured to execute the weighted addition processing, to acquire a pixel value of the image of the Bayer array.

The pixel array unit may include the second pixels arranged in a checkered pattern and the first pixels arranged in the remaining part, and may include a floating diffusion area that is shared in a predetermined pixel unit including a plurality of pixels, the plurality of pixels each including a photoelectric conversion element, and that holds charge accumulated by each of the photoelectric conversion elements of the pixels to be read out as a signal.

The pixel drive unit may be configured to cause the shared floating diffusion area to hold the charge acquired from the first pixels having the same color component in a pixel sharing and simultaneously read out the charge.

The pixel drive unit may be configured to read out the charge acquired from all of the first pixels in a pixel sharing.

The solid-state imaging device may further include an analog-to-digital conversion unit configured to analog-to-digital-convert the pixel information acquired from the first pixels in a pixel sharing.

The first pixels may include pixels corresponding to any one of color components of red (R), green (G), and blue (B), and the second pixels may include white (W) pixels.

According to another embodiment of the present disclosure, there is provided a driving method for a solid-state imaging device including a pixel array unit, a pixel drive unit, and a signal processing unit. The pixel array unit includes first pixels and second pixels, the first pixels corresponding to respective color components of a plurality of color components, the second pixels having luminance components as main components, the first pixels and the second pixels being arranged regularly in a matrix. The pixel drive unit is configured to drive the pixels arranged in the pixel array unit. The signal processing unit is configured to execute predetermined weighted addition processing and calculate a pixel value of an output image by using only pixel information acquired from the first pixels. The driving method includes driving, by the pixel drive unit, the pixels to share a floating diffusion area in a predetermined pixel unit including a plurality of pixels, the plurality of pixels each including a photoelectric conversion element, the floating diffusion area holding charge accumulated by each of the photoelectric conversion elements of the pixels to be read out as a signal.

According to another embodiment of the present disclosure, there is provided an electronic apparatus including a solid-state imaging device including a pixel array unit, a pixel drive unit, and a signal processing unit. The pixel array unit includes first pixels and second pixels, the first pixels corresponding to respective color components of a plurality of color components, the second pixels having luminance components as main components, the first pixels and the second pixels being arranged regularly in a matrix. The pixel drive unit is configured to drive the pixels arranged in the pixel array unit. The signal processing unit is configured to execute predetermined weighted addition processing and calculate a pixel value of an output image by using only pixel information acquired from the first pixels.

In the solid-state imaging device, the driving method for the solid-state imaging device, and the electronic apparatus according to the embodiments of the present disclosure, the pixels arranged in the pixel array unit are driven, the pixel array unit including first pixels and second pixels, the first pixels corresponding to respective color components of a plurality of color components, the second pixels having luminance components as main components, the first pixels and the second pixels being arranged regularly in a matrix, and predetermined weighted addition processing is executed and a pixel value of an output image is calculated by using only pixel information acquired from the first pixels.

According to the embodiments of the present disclosure, it is possible to perform appropriate signal processing corresponding to an image capturing state.

These and other objects, features and advantages of the present disclosure will become more apparent in light of the following detailed description of best mode embodiments thereof, as illustrated in the accompanying drawings.

DETAILED DESCRIPTION OF EMBODIMENTS

Hereinafter, embodiments of the present disclosure will be described with reference to the drawings.
<First Embodiment>
(Configuration Example of Solid-State Imaging Device)

Figure 1:
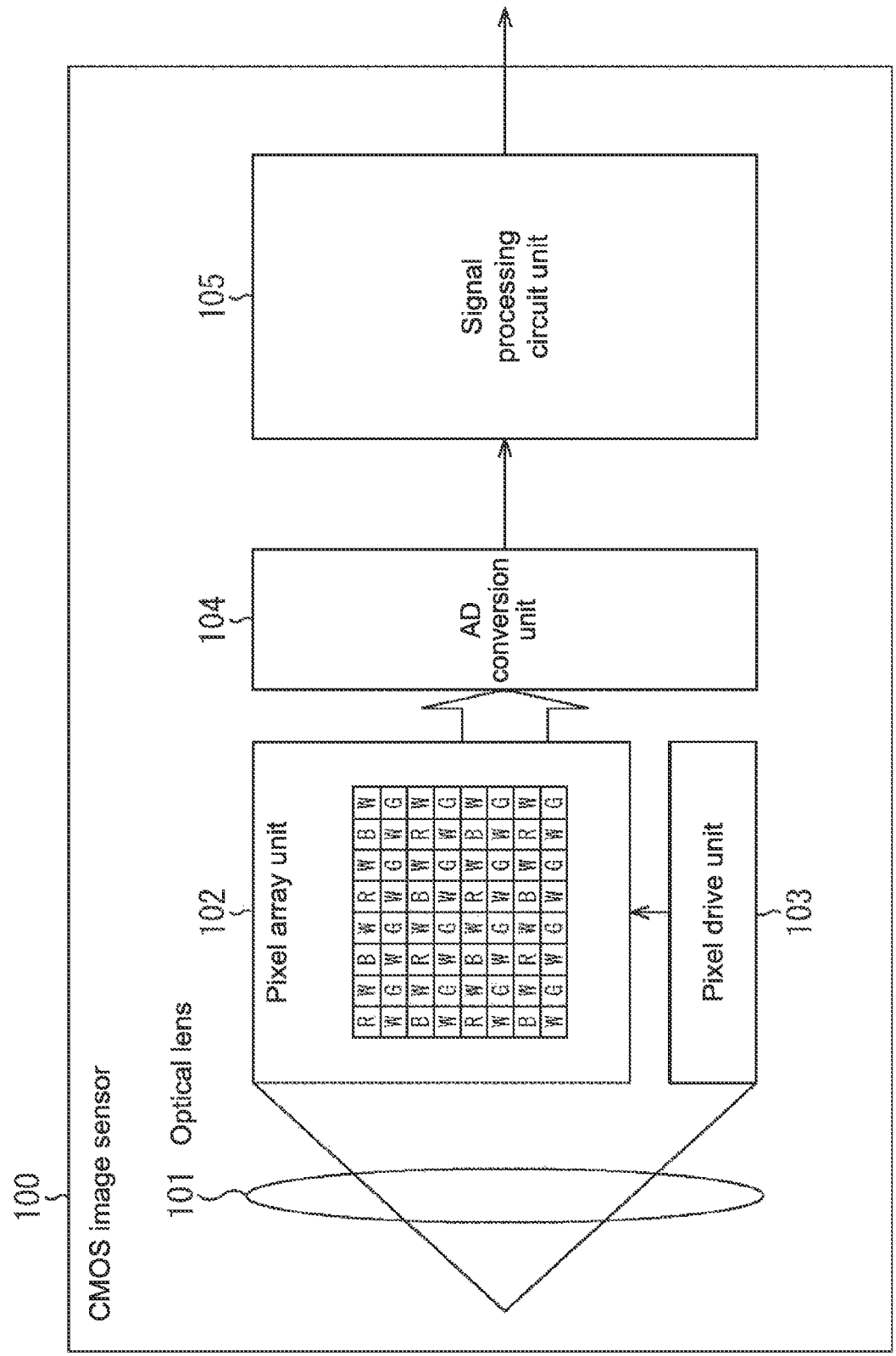
FIG. 1 is a diagram of a CMOS (Complementary Metal Oxide Semiconductor) image sensor to which an embodiment of the present disclosure is applied.

FIG. 1 is a diagram of a CMOS (Complementary Metal Oxide Semiconductor) image sensor to which an embodiment of the present disclosure is applied.

A CMOS image sensor 100 of FIG. 1 is an example of a solid-state imaging device. As shown in FIG. 1, the CMOS image sensor 100 includes an optical lens 101, a pixel array unit 102, a pixel drive unit 103, an AD (analog-to-digital) conversion unit 104, and a signal processing circuit unit 105.

In the pixel array unit 102, unit pixels (hereinafter, also referred to as "pixel" in some cases) including photodiodes (PD) are two-dimensionally arranged in a matrix. In the pixel array unit 102, W pixels having luminance components as main components are arranged in a checkered pattern, and R pixels, G pixels, and B pixels corresponding to respective color components of a plurality of color components are arranged in the remaining part. In the array example of FIG. 1, the number of arranged G pixels is larger than the number of arranged R or B pixels.

Further, in each unit pixel, the photodiode generates charge with a charge amount corresponding to the amount of light collected by the optical lens 101 and accumulates the charge therein. The charge accumulated by the photodiode (PD) is transferred to a floating diffusion (FD) area, which will be hereinafter referred to as FD. The charge held in the FD is read out as a pixel signal.

Further, in the pixel array unit 102, for the pixel array in a matrix, pixel drive lines are formed for each row along a pixel array direction of the pixel rows, and vertical signal lines are formed for each column along a pixel array direction of the pixel columns. Ends of the pixel drive lines are connected to output ends that comply with the respective rows of the pixel drive unit 103. Furthermore, ends of the vertical signal lines are connected to output ends that comply with the respective columns of the AD conversion unit 104.

The pixel drive unit 103 performs read-out driving on the pixels arranged in the pixel array unit 102 in a predetermined method. Pixel signals output from the unit pixels of a pixel row driven by the pixel drive unit 103 are supplied to the AD conversion unit 104 via the vertical signal line.

The AD conversion unit 104 AD-converts analog pixel signals, which are input via the vertical signal lines, into digital pixel signals and supplies the digital pixel signals thus obtained to the signal processing circuit unit 105.

The signal processing circuit unit 105 performs predetermined signal processing on the digital pixel signals supplied from the AD conversion unit 104, and thus calculates a pixel value of an output image and outputs the pixel value to a circuit or the like in a subsequent stage. In this signal processing, for example, weighted addition processing in at least one of a horizontal direction, a vertical direction, and an oblique direction is performed.

The CMOS image sensor 100 is configured as described above.

(Example of Read-out Driving of Pixels)

Figure 2:
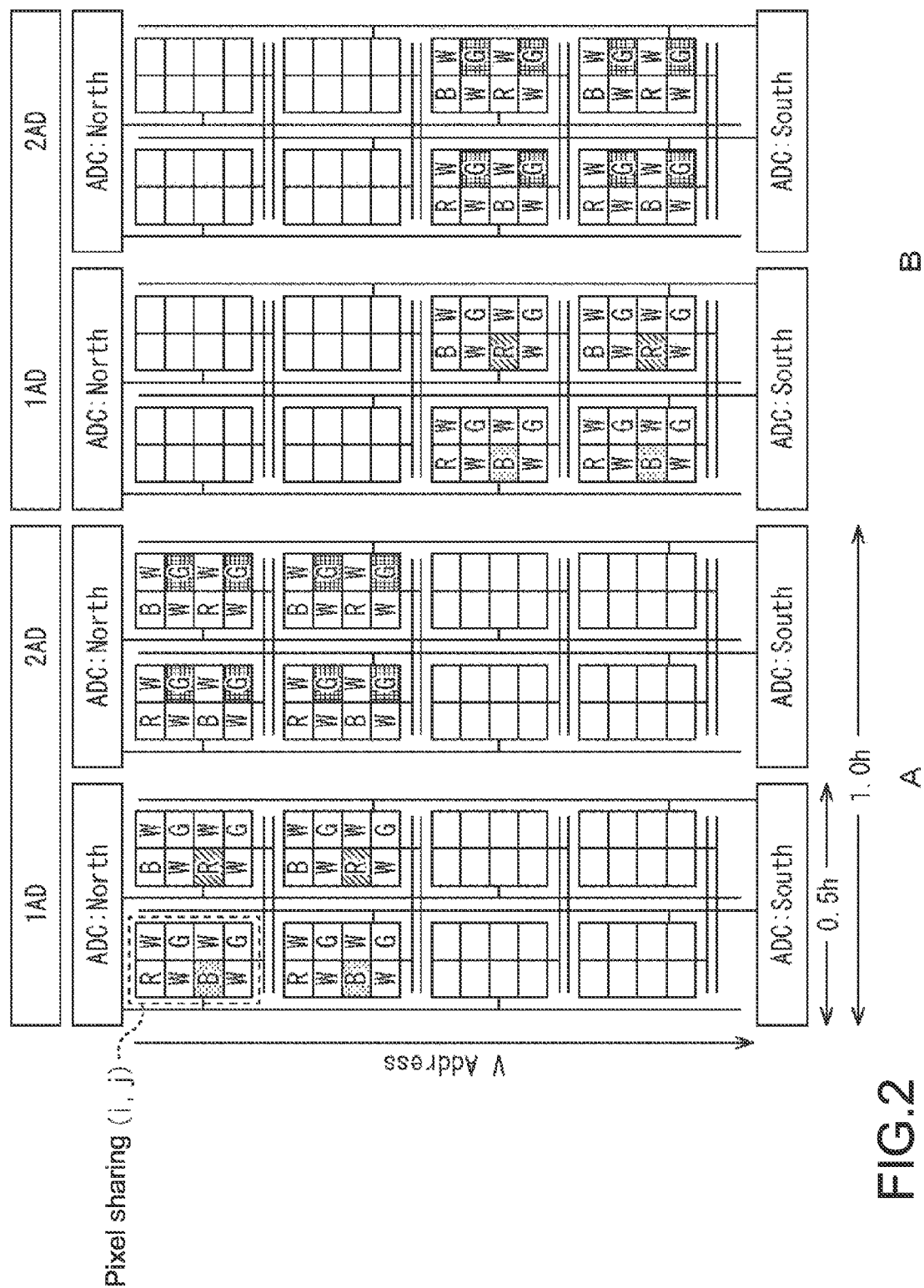
FIG. 2 is a diagram for describing read-out driving of pixels in a first embodiment.

FIG. 2 is a diagram for describing read-out driving of pixels in a first embodiment.

In FIG. 2, in a plurality of pixels arranged in a matrix in the pixel array unit 102 of FIG. 1, part of pixels corresponding to four columns is extracted and arranged in chronological order, with a direction from the left to the right in FIG. 2 being set as a time direction. Further, in the pixel array unit 102, pixel sharing is carried out on pixels in units of eight pixels (2×4 pixels) constituted of two pixels in the horizontal direction by four pixels in the vertical direction. The photodiodes (PD) of the eight pixels (four W pixels, two G pixels, one R pixel, and one B pixel) in the pixel sharing share one FD.

In other words, FIG. 2 shows in its A part the state of pixels 0.5 seconds after and the state of pixels one second after in the first and second rows in the case where the common pixels in the pixel sharing are assumed as a unit, and shows that a pixel with hatching is read out among the pixels in each pixel sharing.

It should be noted that in the following direction, in the pixel array unit 102, a block of the common pixels is referred to as pixel sharing (i,j). In this case, i (i is an integer of 1 or more) represents a row in units of the common pixels, and j (j is an integer of 1 or more) represents a column in units of the common pixels.

Further, FIG. 2 shows in its A part the AD conversion unit 104 of FIG. 1. Here, two ADCs (Analog-to-Digital Converter), that is, a North ADC and a South ADC are provided on the upper side and the lower side in the A part of FIG. 2. Further, each pixel sharing is connected to the North ADC or the South ADC via the vertical signal lines arranged in the vertical direction. In the example of the A part of FIG. 2, the pixel sharing in an odd-numbered row is connected to the North ADC, while the pixel sharing in an even-numbered row is connected to the South ADC. Furthermore, each pixel sharing is connected to the pixel drive unit 103 of FIG. 1 via the pixel drive lines arranged in the horizontal direction.

As shown in the A part of FIG. 2, in the first AD conversion performed in 0.5 seconds, a B pixel in a pixel sharing (1,1) and an R pixel in a pixel sharing (1,2) are read out by the vertical signal lines connected to the North ADC. Further, a B pixel in a pixel sharing (2,1) and an R pixel in a pixel sharing (2,2) are read out by the vertical signal lines connected to the South ADC. Furthermore, in the North ADC and the South ADC, analog pixel signals read out from the respective B pixels and R pixels are AD-converted.

After the termination of the first AD conversion, in the second AD conversion performed in the next 0.5 seconds, two G pixels in the pixel sharing (1,1) and two G pixels in the pixel sharing (1,2) are read out by the vertical signal lines connected to the North ADC. Further, two G pixels in the pixel sharing (2,1) and two G pixels in the pixel sharing (2,2) are read out by the vertical signal lines connected to the South ADC. Furthermore, in the North ADC and the South ADC, analog pixel signals read out from the respective G pixels are AD-converted.

It should be noted that the common pixels in each pixel sharing use a shared FD, and thus in the second AD conversion, charge accumulated by the photodiodes (PD) of the two G pixels in the pixel sharing are simultaneously transferred to one FD and simultaneously read out as pixel signals via the vertical signal lines.

In the above description, among the pixel sharing in the first and second rows, the read-out of pixels of the pixel sharing in the first and second columns has been described as an example, but the read-out of pixels of the pixel sharing in the third and subsequent columns is also performed in the same manner. Further, in the above description, the read-out of pixels of the pixel sharing in the first and second rows has been described as an example, but as shown in the B part of FIG. 2, the read-out of pixels of the pixel sharing in the third and subsequent rows is also performed in the same manner.

In such a manner, in the pixel array unit 102, a pixel array in which the W pixels are arranged in a checkered pattern and the R pixels, the G pixels, and the B pixels are arranged in the remaining part is adopted. In such a pixel array, the W pixels having luminance components as main components are not read out and only the R pixels, G pixels, and B pixels corresponding to respective color components of the plurality of color components are read out. The analog pixel signals obtained from the pixels with the respective color components are AD-converted and supplied as digital signals to the signal processing circuit unit 105.

Further, the North ADC and the South ADC are provided to serve as the AD conversion unit 104, and the common pixels in the pixel sharing are connected to any one of the North ADC and the South ADC via the vertical signal lines. This allows the speed of reading out pixels corresponding to one line to be doubled. As a result, a plurality of pixels arranged in a matrix in the pixel array unit 102 can be read out at high speed.

(Example of Weighted Addition Processing)

Figure 3:
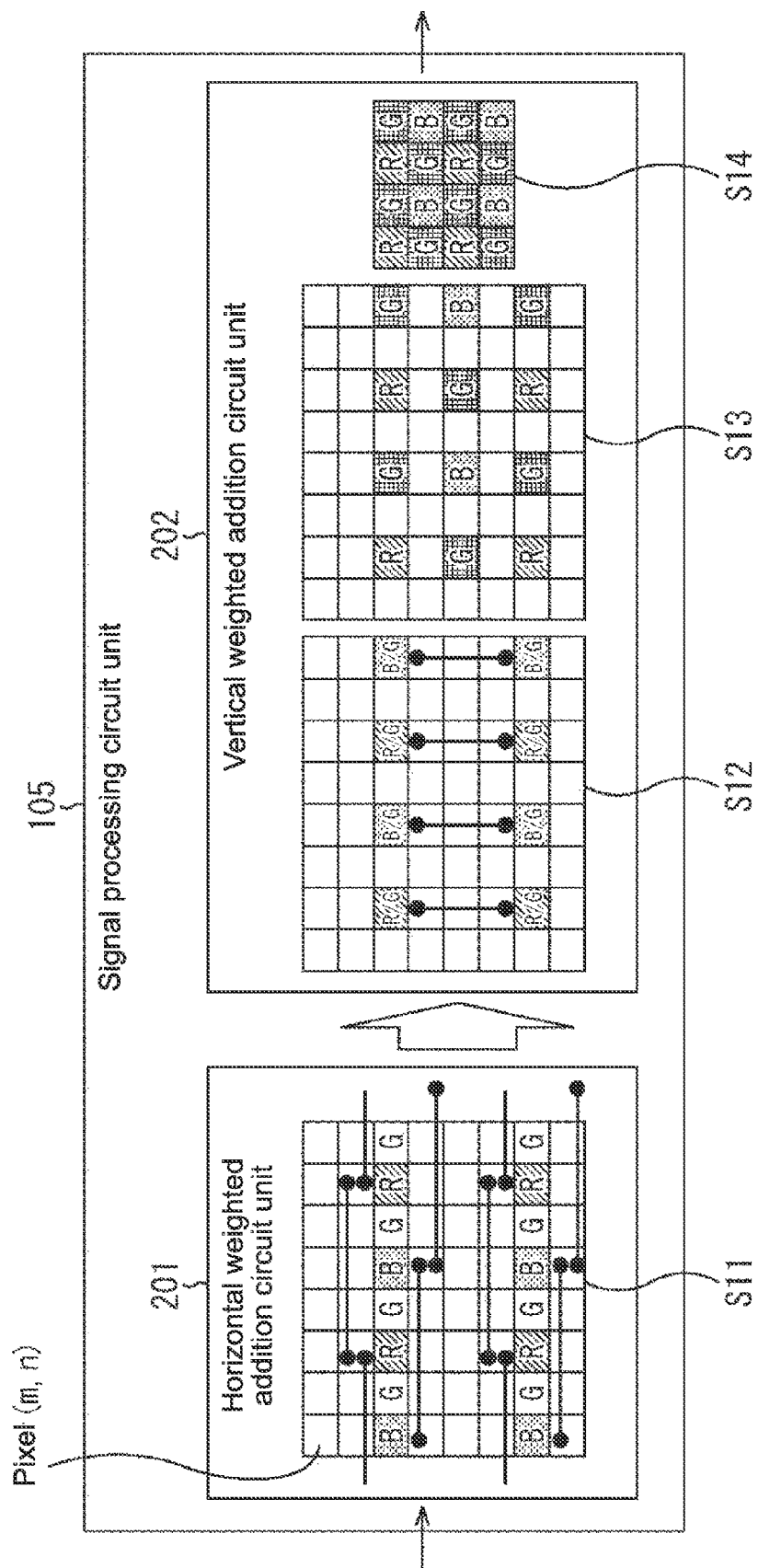
FIG. 3 is a diagram for describing weighted addition processing in the first embodiment.

FIG. 3 is a diagram for describing weighted addition processing in the first embodiment.

In the first embodiment, the signal processing circuit unit 105 of FIG. 1 includes a horizontal weighted addition circuit unit 201 and a vertical weighted addition circuit unit 202.

The horizontal weighted addition circuit unit 201 executes weighted addition processing in a horizontal direction for the digital pixel signals supplied from the AD conversion unit 104 (S11).

As shown in FIG. 3, the horizontal weighted addition circuit unit 201 shows processing content of the weighted addition processing in the horizontal direction, and the square of 8×8 pixels corresponds to pixel signals of pixels having respective color components obtained as a result of the AD conversion.

It should be noted that in the pixel array in Step S11 of FIG. 3, for easy understanding of the description, the pixels having the respective color components are shown in only the third and seventh rows so as to comply with the pixel sharing having the eight pixels shown in FIG. 2. Actually, the pixels having the respective color components are arranged in each row. Additionally, in the following description, the pixels arranged in a matrix are each referred to as a pixel (m,n). In this case, m (m is an integer) represents a row and n (n is an integer) represents a column.

For example, in the third row, the pixels of the respective color components of B, G, R, G, . . . are arranged in order. A pixel signal of a B pixel (3,1) corresponds to a pixel signal that is read out from the B pixel of the pixel sharing (1,1) and AD-converted by the first AD conversion of FIG. 2. Further, a pixel signal of a G pixel (3,2) corresponds to pixel signals that are simultaneously read out from the two G pixels of the pixel sharing (1,1) and AD-converted by the second AD conversion of FIG. 2.

Similarly, a pixel signal of an R pixel (3,3) corresponds to a pixel signal that is read out from the R pixel of the pixel sharing (1,2) and AD-converted by the first AD conversion of FIG. 2. Further, a pixel signal of a G pixel (3,4) corresponds to pixel signals that are simultaneously read out from the two G pixels of the pixel sharing (1,2) and AD-converted by the second AD conversion of FIG. 2.

Although description is omitted to avoid repetition, the same relationship is found in the pixels of respective columns subsequent to a B pixel (3,5) in the third row. Further, the same relationship is also found in the pixels with the respective color components of B, G, R, G, . . . in the seventh row.

Here, the horizontal weighted addition circuit unit 201 performs weighted addition on the R pixels and on the B pixels of the same row, respectively, so as to obtain a ratio of 1:3 in the horizontal direction.

Specifically, for example, when the weighted addition is performed on the B pixel (3,1) and the B pixel (3,5) at a ratio of 1:3 in the horizontal direction, a B pixel subjected to the weighted addition is superimposed at the position of the G pixel (3,4). Further, for example, when the weighted addition is performed on the R pixel (3,3) and an R pixel (3,7) at a ratio of 1:3 in the horizontal direction, an R pixel subjected to the weighted addition is superimposed at the position of a G pixel (3,6).

Similarly, for the pixels with the respective color components of B, G, R, G, . . . in the seventh row, the weighted addition is performed on the R pixels and on the B pixels, respectively, at a ratio of 1:3 in the horizontal direction.

In such a manner, when the weighted addition is performed on the R pixels and on the B pixels of the same row, respectively, so as to obtain a ratio of 1:3 in the horizontal direction, an R pixel or a B pixel subjected to the weighted addition is superimposed at the position of a G pixel. It should be noted that an R pixel or a B pixel is superimposed at the position of a G pixel, but the weighted addition in the horizontal direction is not performed on a G pixel itself.

The weighted addition processing in the horizontal direction as described above is repeated on pixels to be processed, and the weighted addition processing in the horizontal direction (S11) is terminated.

The vertical weighted addition circuit unit 202 executes weighted addition processing in a vertical direction such that the output from the horizontal weighted addition circuit unit 201 (pixel array of S12) is changed into a pixel array of the Bayer array (S12 to S14).

As shown in FIG. 3, the vertical weighted addition circuit unit 202 shows processing content of the weighted addition processing in the vertical direction. In the pixel array of S12, due to the above-mentioned weighted addition processing in the horizontal direction (S11), the R pixels or the B pixels are superimposed at the positions of the G pixels in the even-numbered columns of the third and seventh rows ("R/G" or "B/G" in FIG. 3).

For example, the G pixel of an R/G pixel (3,2) and the G pixel of an R/G pixel (7,2) are equally added at a ratio of 1:1 in the vertical direction (S12), and thus a G pixel (5,2) is obtained (S13). Further, at the positions of the R/G pixel (3,2) and the R/G pixel (7,2), when the current position information is acquired and the R pixels superimposed on the G pixels are used without change, R pixels are obtained without performing the weighted addition in the vertical direction (S13).

Further, a B/G pixel (3,4) and a B/G pixel (7,4) are equally added at a ratio of 1:1 in the vertical direction (S12), and thus a B pixel (5,4) is obtained (S13). Further, at the positions of the B/G pixel (3,4) and the B/G pixel (7,4), when the current position information is acquired and the G pixels on which the B pixels are superimposed are used without change, G pixels are obtained without performing the weighted addition in the vertical direction (S13).

In such a manner, when the R/G pixels in the same column are equally added at a ratio of 1:1 in the vertical direction by using the G pixels, a G pixel is obtained at the intermediate position. Further, when the R pixels are used without change at the positions of the R/G pixels, R pixels are obtained. On the other hand, when the B/G pixels in the same column are equally added at a ratio of 1:1 in the vertical direction by using the B pixels, a B pixel is obtained at the intermediate position. Further, when the G pixels are used without change at the positions of the B/G pixels, G pixels are obtained.

The weighted addition processing as described above is repeated, and thus the output from the horizontal weighted addition circuit unit 201 (pixel array of S12) is changed into a pixel array of the Bayer array (S12, S13).

In other words, in the signal processing circuit unit 105 of FIG. 3, after the horizontal weighted addition circuit unit 201 performs the weighted addition processing in the horizontal direction (S11), the vertical weighted addition circuit unit 202 performs the weighted addition processing in the vertical direction (S12, S13) such that the input pixels are arranged in the Bayer array. Subsequently, in the signal processing circuit unit 105, the pixels arranged in the Bayer array are obtained (S14), and their pixel values are output to a circuit or the like in a subsequent stage.

Hereinabove, the first embodiment has been described. In the first embodiment, the weighted addition processing in the horizontal direction and the vertical direction are performed not using the W pixels having luminance components as main components but using only the R pixels, G pixels, and B pixels corresponding to the respective color components of the plurality of color components, and the pixel values of the pixels arranged in the Bayer array are output. As a result, a captured image obtained from the output pixel values can achieve an image quality in which a false color is suppressed.

Further, as described on the read-out driving of the pixels of FIG. 2, only one pixel is read out among four pixels in the vertical direction. This can reduce the number of pixels to be read in the vertical direction and thus allows high-speed read-out. Further, since the North ADC and the South ADC are provided to serve as the AD conversion unit 104, the speed of reading out pixels corresponding to one line can be improved. This can improve the frame rate. Additionally, this can eliminate the loss of an angle of view and achieve a high frame rate and can also suppress the occurrence of moire arising from the thinning-out intervals of pixel read-out.

<Second Embodiment>

(Configuration Example of Solid-State Imaging Device)

Next, a second embodiment will be described. In the second embodiment, the configuration of a solid-state imaging device is the same as that of the CMOS image sensor 100 shown in FIG. 1 and thus description thereof will be omitted.

(Example of Read-out Driving of Pixels)

Figure 4:
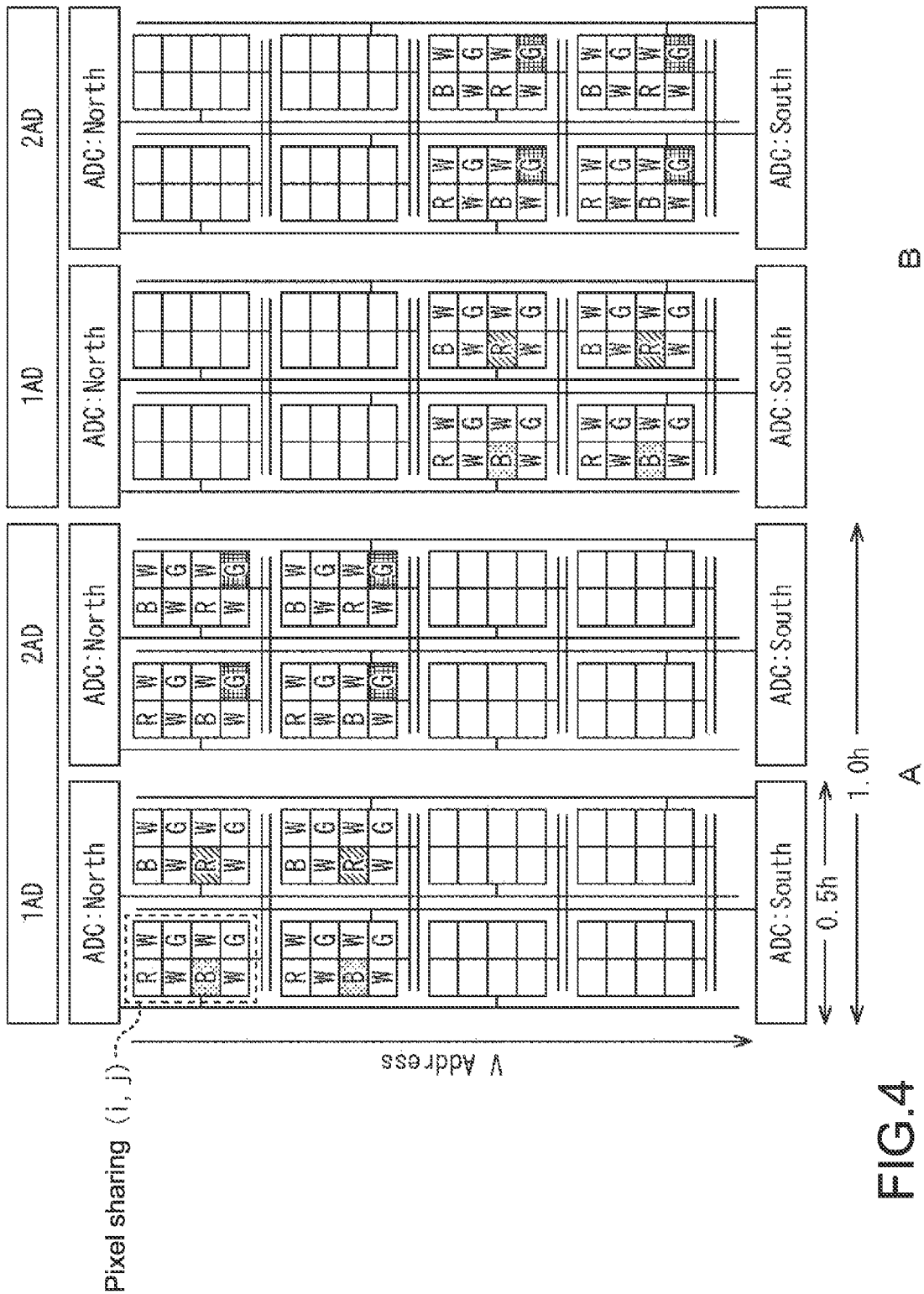
FIG. 4 is a diagram for describing read-out driving of pixels in a second embodiment.

FIG. 4 is a diagram for describing read-out driving of pixels in the second embodiment.

In FIG. 4, as in FIG. 2, the pixel sharing is carried out on pixels in units of eight pixels (4×2 pixels) arranged in a matrix in the pixel array unit 102 of FIG. 1. Further, the North ADC and the South ADC are provided to serve as the AD conversion unit 104 of FIG. 1, which is also the same as in FIG. 2.

In the read-out driving of pixels of FIG. 4, a B pixel and an R pixel in the respective pixel sharing are read out in the first AD conversion, and G pixels in the respective pixel sharing are read out in the second AD conversion. This is the same as the read-out driving of pixels of FIG. 2. On the other hand, the read-out driving of pixels of FIG. 4 is different from the read-out driving of pixels of FIG. 2 in that only one G pixel is read out in the second AD conversion, though the two G pixels are simultaneously read out in the second AD conversion in the read-out driving of pixels of FIG. 2.

(Example of Weighted Addition Processing)

Figure 5:
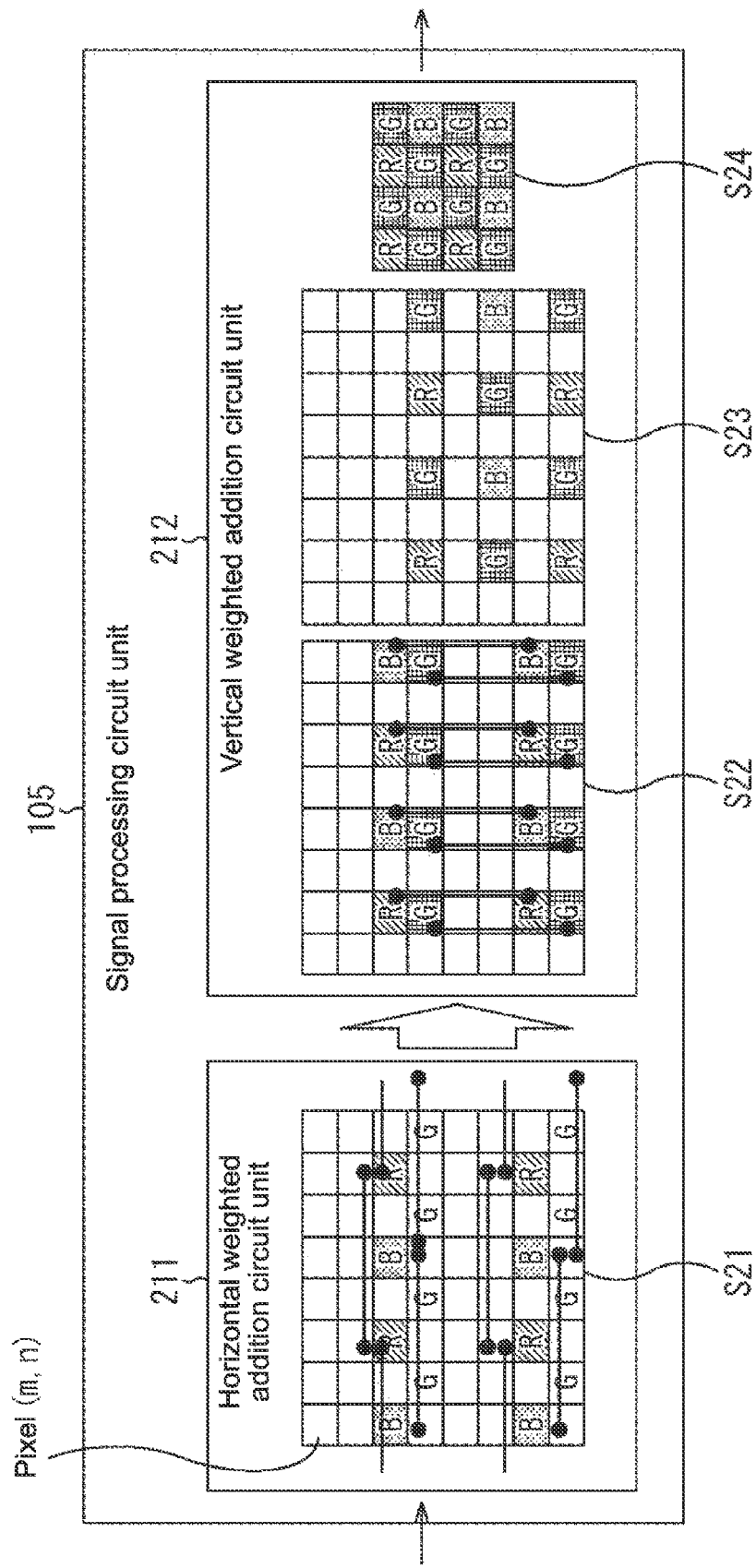
FIG. 5 is a diagram for describing weighted addition processing in the second embodiment.

FIG. 5 is a diagram for describing weighted addition processing in the second embodiment.

In the second embodiment, the signal processing circuit unit 105 of FIG. 1 includes a horizontal weighted addition circuit unit 211 and a vertical weighted addition circuit unit 212.

The horizontal weighted addition circuit unit 211 executes weighted addition processing in a horizontal direction for the digital pixel signals supplied from the AD conversion unit 104 (S21).

As shown in FIG. 5, the horizontal weighted addition circuit unit 211 shows processing content of the weighted addition processing in the horizontal direction.

For example, in the third row, B pixels and R pixels are repeatedly alternately arranged in every other column. A pixel signal of a B pixel (3,1) corresponds to a pixel signal that is read out from a B pixel of a pixel sharing (1,1) and AD-converted by the first AD conversion of FIG. 4. Further, a pixel signal of an R pixel (3,3) corresponds to a pixel signal that is read out from an R pixel of a pixel sharing (1,2) and AD-converted by the first AD conversion of FIG. 4.

Further, for example, in the fourth row, G pixels are repeatedly arranged in every other column. A pixel signal of a G pixel (4,2) corresponds to a pixel signal that is read out from one G pixel of the pixel sharing (1,1) and AD-converted by the second AD conversion of FIG. 4. Further, a pixel signal of a G pixel (4,4) corresponds to a pixel signal that is read out from one G pixel of the pixel sharing (1,2) and AD-converted by the second AD conversion of FIG. 4.

Although description is omitted to avoid repetition, the same relationship is found in other pixels.

Here, the horizontal weighted addition circuit unit 211 performs weighted addition on the R pixels and on the B pixels of the same row, respectively, so as to obtain a ratio of 1:3 in the horizontal direction.

Specifically, for example, when the weighted addition is performed on the B pixel (3,1) and a B pixel (3,5) at a ratio of 1:3 in the horizontal direction, a B pixel (3,4) is obtained. Further, for example, when the weighted addition is performed on the R pixel (3,3) and an R pixel (3,7) at a ratio of 1:3 in the horizontal direction, an R pixel (3,6) is obtained.

In such a manner, when the weighted addition is performed on the R pixels and on the B pixels of the same row, respectively, so as to obtain a ratio of 1:3 in the horizontal direction, an R pixel and a B pixel are obtained. It should be noted that the weighted addition in the horizontal direction is not performed on the G pixels. The current position information of the G pixels are acquired and then the G pixels are used without change in the vertical weighted addition circuit unit 212.

The weighted addition processing in the horizontal direction as described above is repeated on pixels to be processed, and the weighted addition processing in the horizontal direction (S21) is terminated.

The vertical weighted addition circuit unit 212 executes weighted addition processing in a vertical direction such that the output from the horizontal weighted addition circuit unit 211 (pixel array of S22) is changed into a pixel array of the Bayer array (S22 to S24).

As shown in FIG. 5, the vertical weighted addition circuit unit 212 shows processing content of the weighted addition processing in the vertical direction. In the pixel array of S22, due to the above-mentioned weighted addition processing in the horizontal direction (S21), the R pixels and the B pixels are alternately arranged in every other column in the third and seventh rows and arranged on the same columns as the G pixels.

For example, the weighted addition is performed on an R pixel (3,2) and an R pixel (7,2) at a ratio of 3:1 in the vertical direction (S22), and thus an R pixel (4,2) is obtained (S23). Further, the weighted addition is performed on a B pixel (3,4) and a B pixel (7,4) at a ratio of 1:3 in the vertical direction (S22), and thus a B pixel (6,4) is obtained (S23).

Further, since the G pixels are arranged in every other column in the fourth and eighth rows, a G pixel (4,2) and a G pixel (8,2) are equally added at a ratio of 1:1 in the vertical direction (S22), and thus a G pixel (6,2) is obtained (S23). Further, when the G pixels are used without change at the positions of a G pixel (4,4) and a G pixel (8,4), G pixels are obtained without performing the weighted addition in the vertical direction (S23).

In such a manner, when the R pixels in the same column are subjected to the weighted addition in the vertical direction at a ratio of 3:1 and the B pixels in the same column are subjected to the weighted addition in the vertical direction at a ratio of 1:3, an R and a B pixels are obtained. Further, among the columns in which pixels are arranged, G pixels in the odd-numbered columns are equally added at a ratio of 1:1 in the vertical direction, and G pixels in the even-numbered columns are used without change after their current position information are acquired.

The weighted addition processing as described above is repeated, and thus the output from the horizontal weighted addition circuit unit 211 (pixel array of S22) is changed into a pixel array of the Bayer array (S22, S23).

In other words, in the signal processing circuit unit 105 of FIG. 5, after the horizontal weighted addition circuit unit 211 performs the weighted addition processing in the horizontal direction (S21), the vertical weighted addition circuit unit 212 performs the weighted addition processing in the vertical direction (S22, S23) such that the input pixels are arranged in the Bayer array. Subsequently, in the signal processing circuit unit 105, the pixels arranged in the Bayer array are obtained (S24), and their pixel values are output to a circuit or the like in a subsequent stage.

Hereinabove, the second embodiment has been described. In the second embodiment, the weighted addition processing in the horizontal direction and the vertical direction are performed not using the W pixels having luminance components as main components but using only the R pixels, G pixels, and B pixels corresponding to the respective color components of the plurality of color components, and the pixel values of the pixels arranged in the Bayer array are output. As a result, a captured image obtained from the output pixel values can achieve an image quality in which a false color is suppressed.

Further, in the read-out driving of the pixels of FIG. 4, only one G pixel is read out by the second AD conversion, unlike the read-out driving of the pixels of FIG. 2 in which the two G pixels are simultaneously read out. This allows the read-out to be performed at higher speed than the read-out driving of the pixels of FIG. 2. Further, the North ADC and the South ADC are provided to serve as the AD conversion unit 104, and thus the speed of reading out pixels corresponding to one line can be improved. As a result, the improvement in both of the frame rate and the speed of read-out can be achieved, and high performance can be maintained.

<Third Embodiment>
(Configuration Example of Solid-State Imaging Device)

Next, a third embodiment will be described. In the third embodiment, the configuration of a solid-state imaging device is the same as that of the CMOS image sensor 100 shown in FIG. 1 and thus description thereof will be omitted.

(Example of Read-out Driving of Pixels)

Figure 6:
FIG. 6 is a diagram for describing read-out driving of pixels in a third embodiment.

FIG. 6 is a diagram for describing read-out driving of pixels in the third embodiment.

In FIG. 6, as in FIG. 2, the pixel sharing is carried out on pixels in units of eight pixels (4×2 pixels) arranged in a matrix in the pixel array unit 102 of FIG. 1. Further, the North ADC and the South ADC are provided to serve as the AD conversion unit 104 of FIG. 1, which is also the same as in FIG. 2.

In the read-out driving of pixels of FIG. 6, a B pixel and an R pixel in the respective pixel sharing are read out in the first AD conversion, and G pixels in the respective pixel sharing is read out in the second AD conversion. This is the same as the read-out driving of pixels of FIGS. 2 and 4. On the other hand, the read-out driving of pixels of FIG. 6 is different from the read-out driving of pixels of FIGS. 2 and 4 in that the R pixels, the G pixels, and the B pixels that are not read out in the read-out driving of pixels of FIGS. 2 and 4 are also read out.

In such a manner, in the read-out driving of pixels of FIG. 6, the R pixels, the G pixels, and the B pixels corresponding to respective color components of a plurality of color components, in other words, all pixels other than the W pixels having luminance components as main components are read out.

(Example of Weighted Addition Processing)

Figure 7:
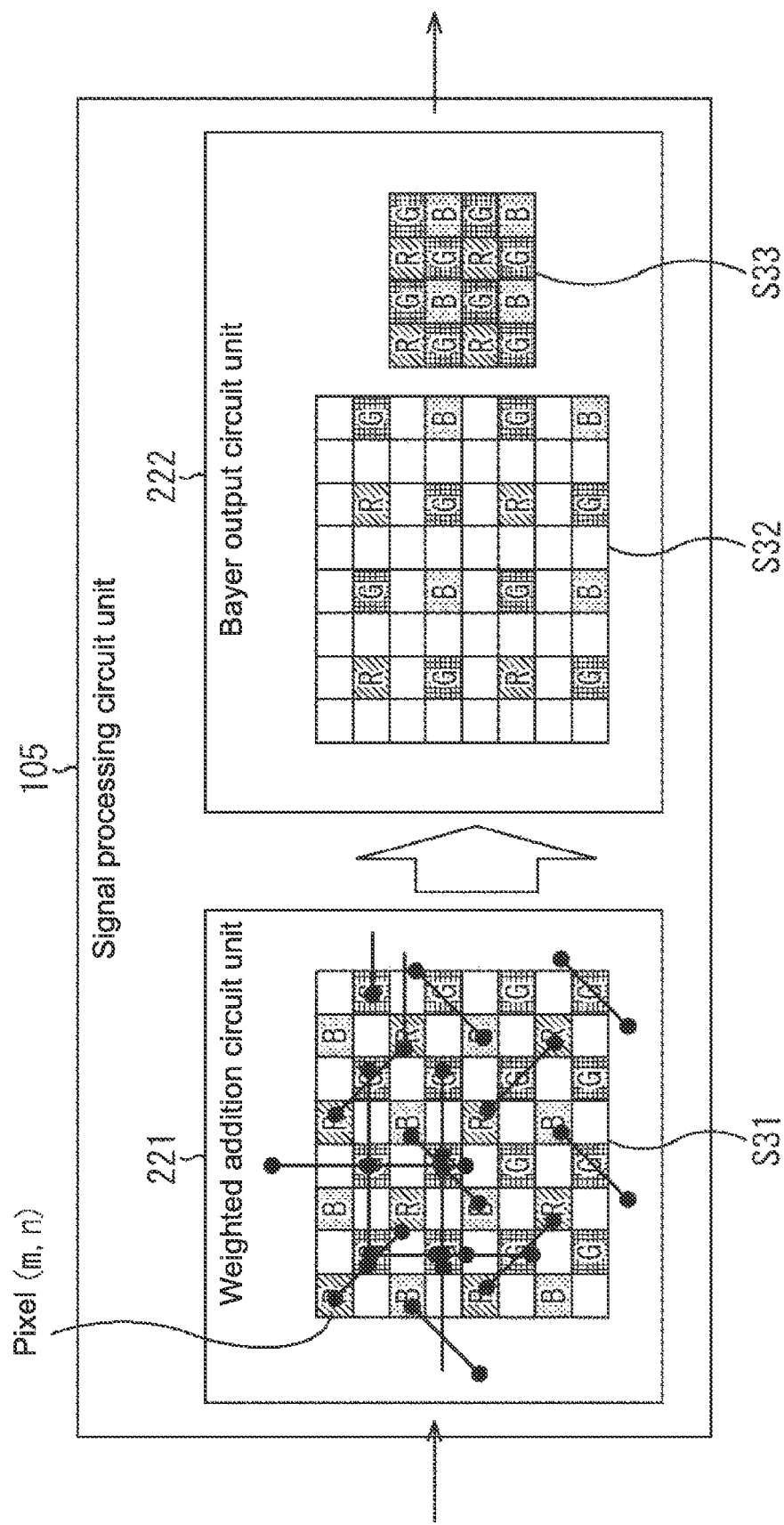
FIG. 7 is a diagram for describing weighted addition processing in the third embodiment.

FIG. 7 is a diagram for describing weighted addition processing in the third embodiment.

In the third embodiment, the signal processing circuit unit 105 of FIG. 1 includes a weighted addition circuit unit 221 and a Bayer output circuit unit 222.

The weighted addition circuit unit 221 executes weighted addition processing for the digital pixel signals supplied from the AD conversion unit 104 (S31).

As shown in FIG. 7, the weighted addition circuit unit 221 shows processing content of the weighted addition processing.

For example, in the first row, R pixels and B pixels are repeatedly alternately arranged in every other column. A pixel signal of an R pixel (1,1) corresponds to a pixel signal that is read out from an R pixel of a pixel sharing (1,1) and AD-converted by the first AD conversion of FIG. 6. Further, a pixel signal of a B pixel (1,3) corresponds to a pixel signal that is read out from a B pixel of a pixel sharing (1,2) and AD-converted by the first AD conversion of FIG. 6.

Further, for example, in the second row, G pixels are repeatedly arranged in every other column. A pixel signal of a G pixel (2,2) corresponds to a pixel signal that is read out from a G pixel of the pixel sharing (1,1) and AD-converted by the second AD conversion of FIG. 6. Further, a pixel signal of a G pixel (2,4) corresponds to a pixel signal that is read out from a G pixel of the pixel sharing (1,2) and AD-converted by the second AD conversion of FIG. 6.

Furthermore, for example, in the third row, B pixels and R pixels are repeatedly alternately arranged in every other column. A pixel signal of a B pixel (3,1) corresponds to a pixel signal that is read out from a B pixel of the pixel sharing (1,1) and AD-converted by the first AD conversion of FIG. 6. Further, a pixel signal of an R pixel (3,3) corresponds to a pixel signal that is read out from an R pixel of the pixel sharing (1,2) and AD-converted by the first AD conversion of FIG. 6.

Furthermore, for example, in the fourth row, G pixels are repeatedly arranged in every other column. A pixel signal of a G pixel (4,2) corresponds to a pixel signal that is read out from a G pixel of the pixel sharing (1,1) and AD-converted by the second AD conversion of FIG. 6. Further, a pixel signal of a G pixel (4,4) corresponds to a pixel signal that is read out from a G pixel of the pixel sharing (1,2) and AD-converted by the second AD conversion of FIG. 6.

Although description is omitted to avoid repetition, the same relationship is found in other pixels.

Here, the weighted addition circuit unit 221 equally adds the R pixels in the first and third rows at a ratio of 1:1 in an oblique direction (S31). Specifically, for example, when the R pixel (1,1) and the R pixel (3,3) are equally added at a ratio of 1:1 in the oblique direction, an R pixel (2,2) is obtained. Further, for example, when an R pixel (1,5) and an R pixel (3,7) are equally added at a ratio of 1:1 in the oblique direction, an R pixel (2,6) is obtained.

Further, the weighted addition circuit unit 221 equally adds the B pixels in the third and fifth rows at a ratio of 1:1 in an oblique direction (S31). Specifically, for example, when a B pixel (3,5) and a B pixel (5,3) are equally added at a ratio of 1:1 in the oblique direction, a B pixel (4,4) is obtained. Further, for example, when a B pixel (3,9) and a B pixel (5,7) are equally added at a ratio of 1:1 in the oblique direction, a B pixel (4,8) is obtained.

Further, the weighted addition circuit unit 221 performs weighted addition on a G pixel of interest and four G pixels around the G pixel of interest so as to obtain a ratio of 4:1:1:1:1 (S31).

Specifically, for example, in the case where the weighted addition in a cross direction centering on the G pixel (2,4) is performed, when the G pixel (2,4) and a G pixel (2,2), a G pixel (2,6), a G pixel (0,4), and a G pixel (4,4), which are arranged around the G pixel (2,4), are subjected to the weighted addition at a ratio of 4:1:1:1:1, a G pixel (2,4) is obtained. Similarly, the weighted addition in the cross direction is also performed on a G pixel (4,2), and a G pixel (4,2) is obtained.

The weighted addition processing as described above is repeated on pixels to be processed, and the input pixels (pixel array of S31) are arranged in a pixel array of the Bayer array, and thus the weighted addition processing (S31) is terminated.

As shown in FIG. 7, the Bayer output circuit unit 222 shows processing content of the Bayer output. In the pixel array of S32, due to the above-mentioned weighted addition processing (S31), the R pixels and the G pixels are repeatedly alternately arranged in every other column in the second and sixth rows, and the G pixels and the B pixels are repeatedly alternately arranged in every other column in the fourth and eighth rows. This pixel array is the Bayer array, and thus the Bayer output circuit unit 222 outputs pixel values of those pixels to a circuit or the like in a subsequent stage (S33).

In other words, in the signal processing circuit unit 105 of FIG. 7, after the weighted addition circuit unit 221 performs the weighted addition processing in the oblique direction and the cross direction (S31) such that the input pixels are arranged in the Bayer array, the Bayer output circuit unit 222 outputs the pixel values of pixels arranged in the Bayer array to a circuit or the like in a subsequent stage (S32, S33).

Hereinabove, the third embodiment has been described. In the third embodiment, the weighted addition processing in the oblique direction and the cross direction are performed not using the W pixels having luminance components as main components but using only the R pixels, G pixels, and B pixels corresponding to the respective color components of the plurality of color components, and the pixel values of the pixels arranged in the Bayer array are output. As a result, a captured image obtained from the output pixel values can achieve an image quality in which a false color is suppressed.

Further, in the read-out driving of pixels of FIG. 6, the R pixels, the G pixels, and the B pixels that are not read out in the read-out driving of pixels of FIG. 2 and FIG. 4 are also read out, and pixels corresponding to the respective color components of the plurality of color components, in other words, all pixels other than the W pixels having luminance components as main components are read out. As a result, more color information is acquired, and thus a captured image obtained from the output pixel values can improve an image quality more.

<Fourth Embodiment>

(Configuration Example of Solid-State Imaging Device)

Next, a fourth embodiment will be described. In the fourth embodiment, the configuration of a solid-state imaging device is the same as that of the CMOS image sensor 100 shown in FIG. 1 and thus description thereof will be omitted.

(Example of Read-out Driving of Pixels)

In the fourth embodiment, the read-out driving of pixels is the same as the read-out driving of pixels of FIG. 6 and thus description thereof will be omitted.

(Example of Weighted Addition Processing)

Figure 8:
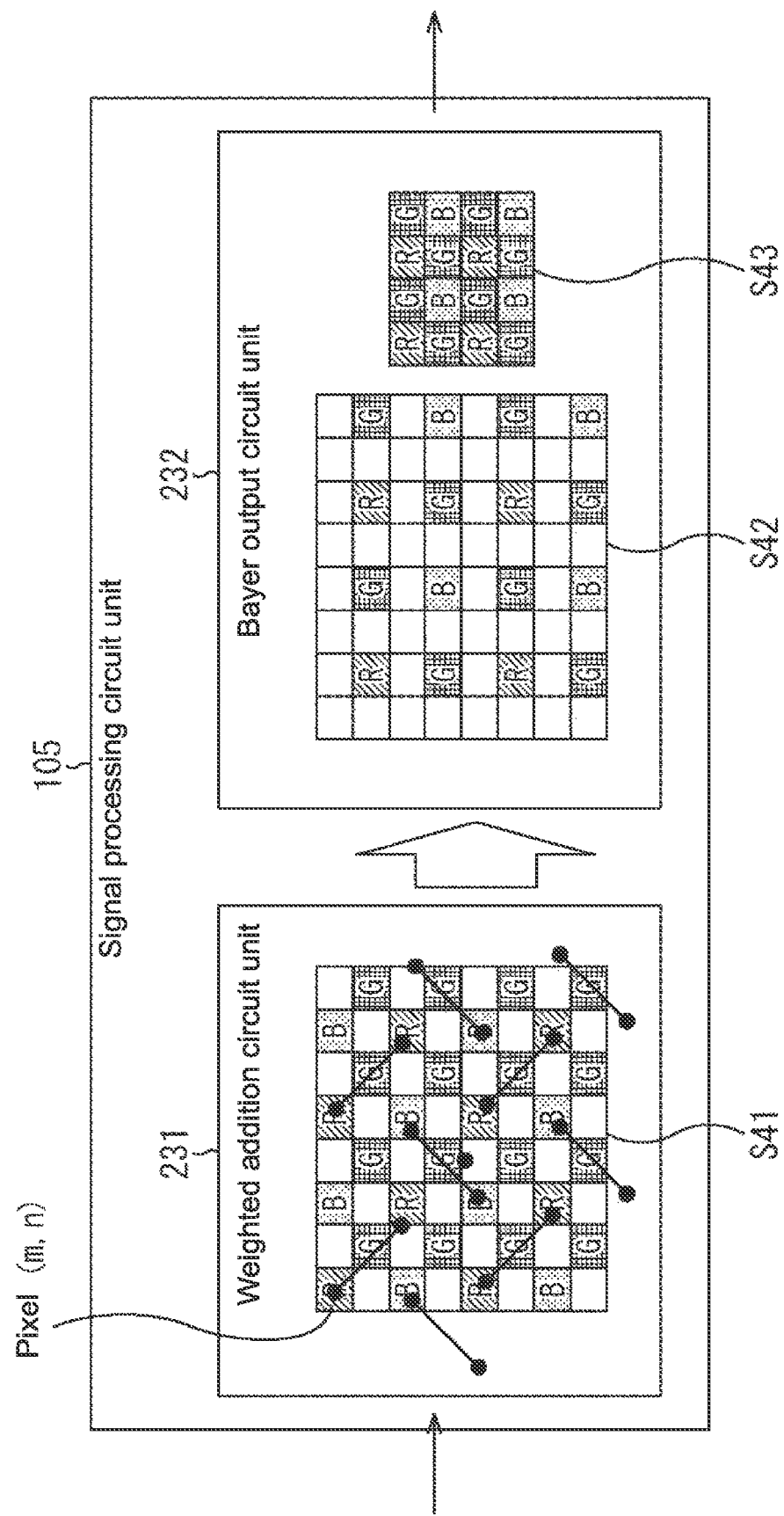
FIG. 8 is a diagram for describing weighted addition processing in a fourth embodiment.

FIG. 8 is a diagram for describing weighted addition processing in the fourth embodiment.

In the fourth embodiment, the signal processing circuit unit 105 of FIG. 1 includes a weighted addition circuit unit 231 and a Bayer output circuit unit 232.

As shown in FIG. 8, the weighted addition circuit unit 231 shows processing content of the weighted addition processing. However, since the read-out driving of pixels of FIG. 6 is performed in the fourth embodiment, a pixel array input to the weighted addition circuit unit 231 corresponds to the pixel array input to the weighted addition circuit unit 221 of FIG. 7.

Here, the weighted addition circuit unit 231 equally adds R pixels in the first and third rows at a ratio of 1:1 in an oblique direction (S41). Specifically, for example, when an R pixel (1,1) and an R pixel (3,3) are equally added at a ratio of 1:1 in the oblique direction, an R pixel (2,2) is obtained. Further, for example, when an R pixel (1,5) and an R pixel (3,7) are equally added at a ratio of 1:1 in the oblique direction, an R pixel (2,6) is obtained.

Further, the weighted addition circuit unit 231 equally adds B pixels in the third and fifth rows at a ratio of 1:1 in an oblique direction (S41). Specifically, for example, when a B pixel (3,5) and a B pixel (5,3) are equally added at a ratio of 1:1 in the oblique direction, a B pixel (4,4) is obtained. Further, for example, when a B pixel (3,9) and a B pixel (5,7) are equally added at a ratio of 1:1 in the oblique direction, a B pixel (4,8) is obtained.

Further, in the weighted addition circuit unit 231, for example, when a G pixel (2,4) and a G pixel (4,2) are used without change, a G pixel (2,4) and a G pixel (4,2) are obtained without performing the weighted addition.

In other words, the weighted addition circuit unit 231 is different from the weighted addition circuit unit 221 of FIG. 7 in that the G pixels are used as they are without performing the weighted addition, though the weighted addition for the R pixels and the B pixels is performed in the same manner.

The weighted addition processing as described above is repeated on pixels to be processed, and the input pixels (pixel array of S41) are arranged in a pixel array of the Bayer array, and thus the weighted addition processing (S41) is terminated.

Similar to the Bayer output circuit unit 222 of FIG. 7, the Bayer output circuit unit 232 outputs the pixel values of pixels arranged in the Bayer array to a circuit or the like in a subsequent stage (S42, S43).

In other words, in the signal processing circuit unit 105 of FIG. 8, after the weighted addition circuit unit 231 performs the weighted addition processing in the oblique direction (S41) such that the input pixels are arranged in the Bayer array, the Bayer output circuit unit 232 outputs the pixel values of pixels arranged in the Bayer array to a circuit or the like in a subsequent stage (S42, S43).

Hereinabove, the fourth embodiment has been described. In the fourth embodiment, the weighted addition processing in the oblique direction is performed not using the W pixels having luminance components as main components but using only the R pixels, G pixels, and B pixels corresponding to the respective color components of the plurality of color components, and the pixel values of the pixels arranged in the Bayer array are output. As a result, a captured image obtained from the output pixel values can achieve an image quality in which a false color is suppressed.

Further, in the read-out driving of pixels of FIG. 6, the R pixels, the G pixels, and the B pixels that are not read out in the read-out driving of pixels of FIG. 2 and FIG. 4 are also read out, and pixels corresponding to the respective color components of the plurality of color components, in other words, all pixels other than the W pixels having luminance components as main components are read out. As a result, more color information is acquired, and thus a captured image obtained from the output pixel values can improve an image quality more.

Furthermore, in the weighted addition processing of FIG. 8 is different from the weighted addition processing of FIG. 7 in that the weighted addition processing for the G pixels is not performed. This can lead to the improvement in resolution.

<Fifth Embodiment>

(Configuration Example of Solid-State Imaging Device)

Next, a fifth embodiment will be described. In the fifth embodiment, the configuration of a solid-state imaging device is the same as that of the CMOS image sensor 100 shown in FIG. 1 and thus description thereof will be omitted.

(Example of Read-out Driving of Pixels)

In the fifth embodiment, the read-out driving of pixels is the same as the read-out driving of pixels of FIG. 2 and thus description thereof will be omitted.

(Example of Weighted Addition Processing)

Figure 9:
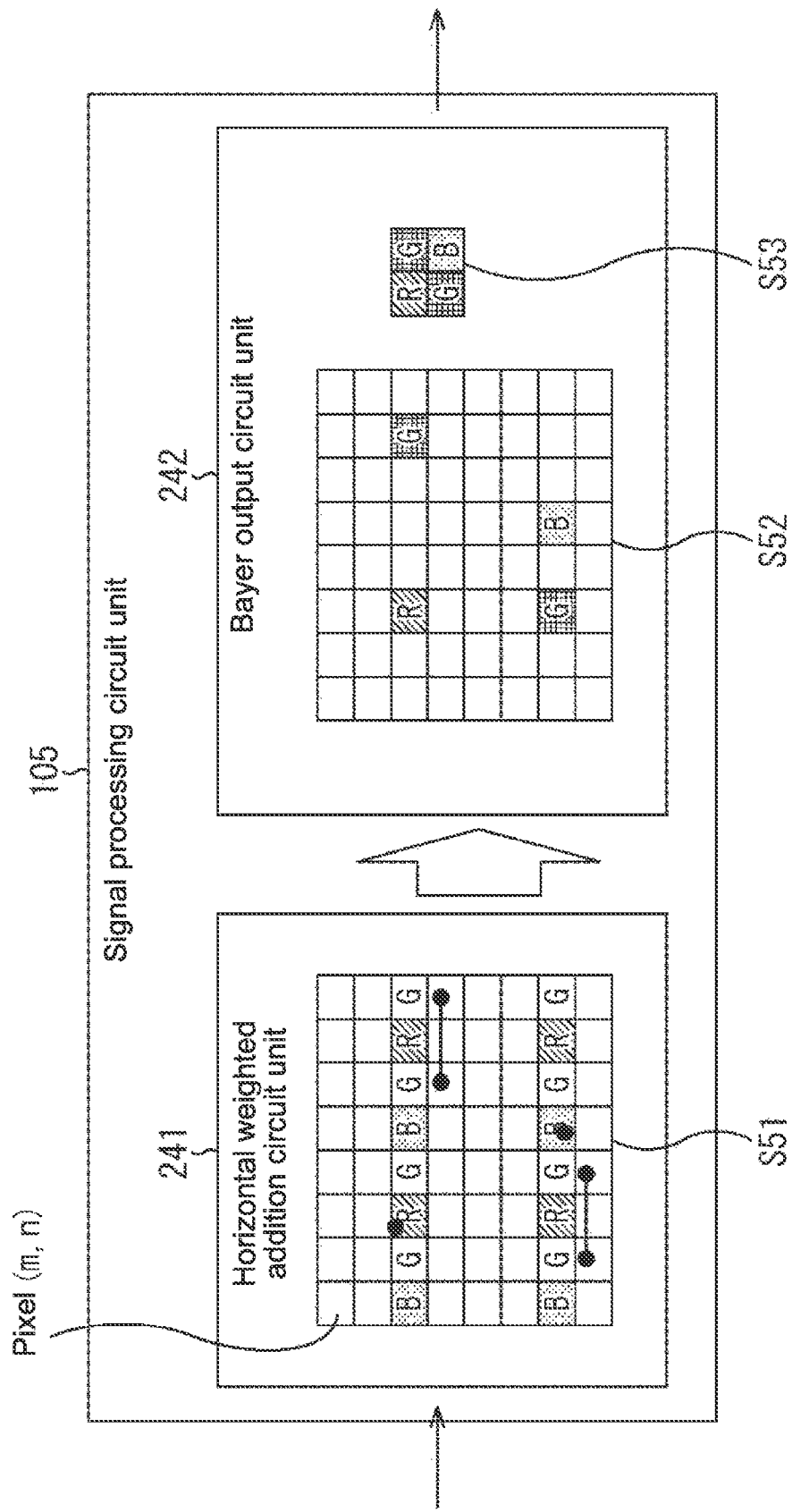
FIG. 9 is a diagram for describing weighted addition processing in a fifth embodiment.

FIG. 9 is a diagram for describing weighted addition processing in the fifth embodiment.

In the fifth embodiment, the signal processing circuit unit 105 of FIG. 1 includes a horizontal weighted addition circuit unit 241 and a Bayer output circuit unit 242.

As shown in FIG. 9, the horizontal weighted addition circuit unit 241 shows processing content of the weighted addition processing in the horizontal direction. However, since the read-out driving of pixels of FIG. 2 is performed in the fourth embodiment, a pixel array input to the horizontal weighted addition circuit unit 241 corresponds to the pixel array input to the horizontal weighted addition circuit unit 201 of FIG. 3.

Here, the horizontal weighted addition circuit unit 241 equally adds adjacent G pixels in the horizontal direction so as to obtain the pixel array of the Bayer array while using R pixels and B pixels without change (S51).

Specifically, for example, an R pixel (3,3) is used without change, and thus an R pixel (3,3) is obtained without performing the weighted addition. Further, when a G pixel (3,6) and a G pixel (3,8) are equally added at a ratio of 1:1 in the horizontal direction, a G pixel (3,7) is obtained.

Further, when a G pixel (7,2) and a G pixel (7,4) are equally added at a ratio of 1:1 in the horizontal direction, a G pixel (7,3) is obtained. Further, a B pixel (7,5) is used without change, and thus a B pixel (7,5) is obtained without performing the weighted addition.

The weighted addition processing as described above and the like are repeated on pixels to be processed, and the input pixels (pixel array of S51) are arranged in a pixel array of the Bayer array, and thus the weighted addition processing in the horizontal direction (S51) is terminated.

Similar to the Bayer output circuit unit 222 or the like of FIG. 7, the Bayer output circuit unit 242 outputs the pixel values of pixels arranged in the Bayer array to a circuit or the like in a subsequent stage (S52, S53).

In other words, in the signal processing circuit unit 105 of FIG. 9, after the horizontal weighted addition circuit unit 241 performs the weighted addition processing in the horizontal direction (S51) such that the input pixels are arranged in the Bayer array, the Bayer output circuit unit 242 outputs the pixel values of pixels arranged in the Bayer array to a circuit or the like in a subsequent stage (S52, S53).

Hereinabove, the fifth embodiment has been described. In the fifth embodiment, the weighted addition processing in the horizontal direction is performed not using the W pixels having luminance components as main components but using only the R pixels, G pixels, and B pixels corresponding to the respective color components of the plurality of color components, and the pixel values of the pixels arranged in the Bayer array are output. As a result, a captured image obtained from the output pixel values can achieve an image quality in which a false color is suppressed.

Further, in the weighted addition processing of FIG. 9, the weighted addition processing for R pixels and B pixels is not performed, which leads to more improvement in resolution. Furthermore, in the weighted addition processing of FIG. 9, for G pixels, adjacent G pixels are equally added in the horizontal direction, and for R pixels and B pixels, processing of acquiring only pixel information is performed. This reduces the amount of calculation, and as a result, power consumption can be reduced.

<Sixth Embodiment>

Lastly, a sixth embodiment will be described. In the sixth embodiment, the configuration of a solid-state imaging device is the same as that of the CMOS image sensor 100 shown in FIG. 1 and thus description thereof will be omitted.

(Example of Read-out Driving of Pixels)

In the sixth embodiment, the read-out driving of pixels is the same as the read-out driving of pixels of FIG. 2 and thus description thereof will be omitted.

(Example of Weighted Addition Processing)

Figure 10:
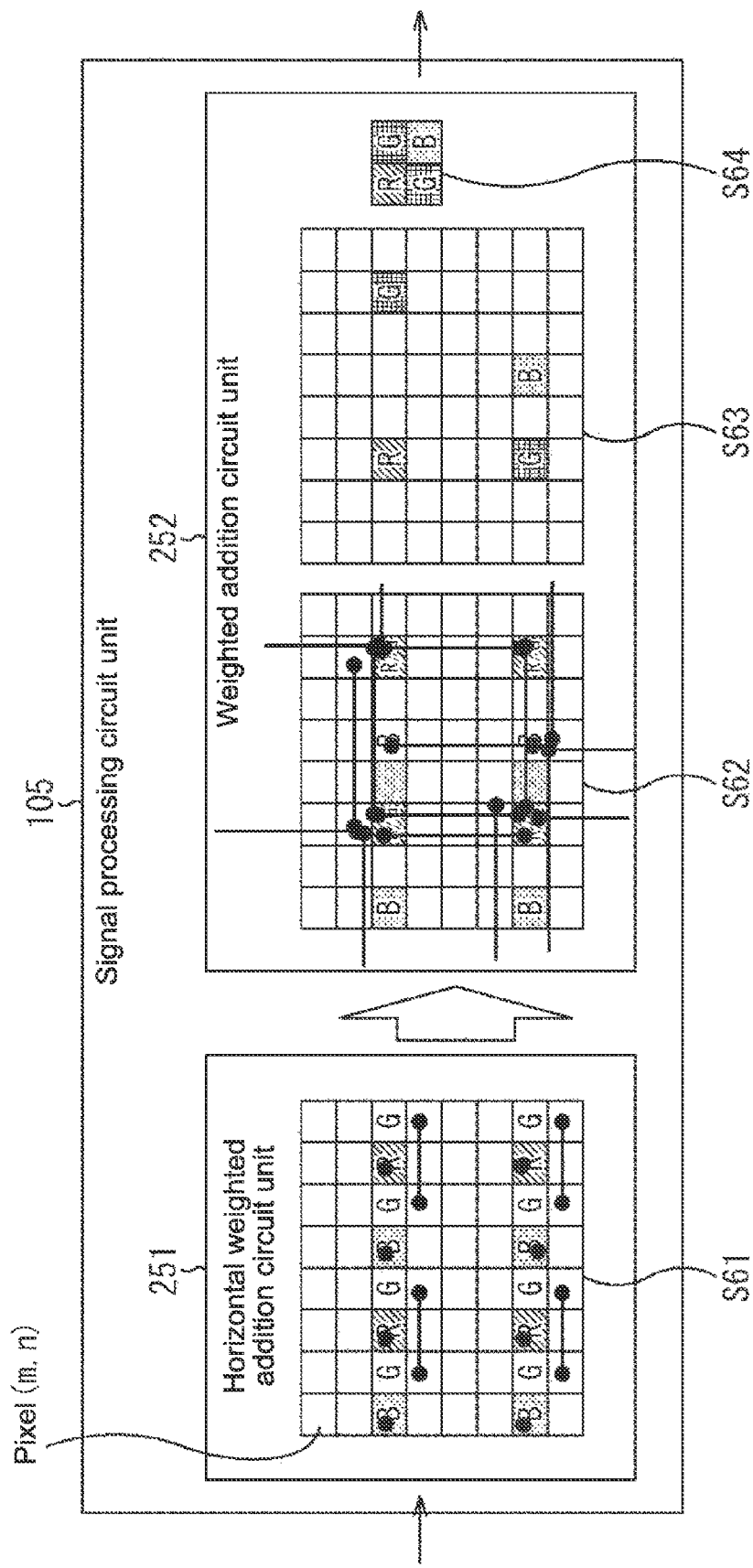
FIG. 10 is a diagram for describing weighted addition processing in a sixth embodiment.

FIG. 10 is a diagram for describing weighted addition processing in the sixth embodiment.

In the sixth embodiment, the signal processing circuit unit 105 of FIG. 1 includes a horizontal weighted addition circuit unit 251 and a weighted addition circuit unit 252.

As shown in FIG. 10, the horizontal weighted addition circuit unit 251 shows processing content of the weighted addition processing in the horizontal direction. However, since the read-out driving of pixels of FIG. 2 is performed in the sixth embodiment, a pixel array input to the horizontal weighted addition circuit unit 251 corresponds to the pixel array input to the horizontal weighted addition circuit unit 201 of FIG. 3.

Here, the horizontal weighted addition circuit unit 251 equally adds adjacent G pixels in the horizontal direction while using R pixels and B pixels without change (S61).

Specifically, for example, a B pixel (3,1), an R pixel (3,3), a B pixel (3,5), and an R pixel (3,7) are used without change, and thus a B pixel (3,1), an R pixel (3,3), a B pixel (3,5), and an R pixel (3,7) are obtained without performing the weighted addition.

Further, when a G pixel (3,2) and a G pixel (3,4) are equally added at a ratio of 1:1 in the horizontal direction, a G pixel subjected to the weighted addition is superimposed at the position of the R pixel (3,3). Similarly, when a G pixel (3,6) and a G pixel (3,8) are equally added at a ratio of 1:1 in the horizontal direction, a G pixel subjected to the weighted addition is superimposed at the position of the R pixel (3,7).

Further, similarly, for the pixels of the respective color components of B, G, R, G, . . . in the seventh row, adjacent G pixels are equally added in the horizontal direction while using R pixels and B pixels as they are without performing the weighted addition processing on the R pixels and B the pixels. Thus, R pixels and B pixels are obtained and G pixels are superimposed on the R pixels.

The weighted addition processing as described above and the like are repeated on pixels to be processed, and the input pixels (pixel array of S61) are arranged in a pixel array of S62, and thus the weighted addition processing in the horizontal direction (S61) is terminated.

The weighted addition circuit unit 252 executes the weighted addition processing such that the output from the horizontal weighted addition circuit unit 251 (pixel array of S62) obtains a pixel array of the Bayer array (S62 to S64).

As shown in FIG. 10, the weighted addition circuit unit 252 shows processing content of the weighted addition processing.

The weighted addition circuit unit 252 performs weighted addition on a G pixel of interest and four G pixels around the G pixel of interest so as to obtain a ratio of 4:1:1:1:1 (S62).

Specifically, for example, in the case where the weighted addition in a cross direction centering on an R/G pixel (7,3) is performed, when the R/G pixel (7,3) and an R/G pixel (7,−1), an R/G pixel (7,7), an R/G pixel (3,3), and an R/G pixel (11,3), which are arranged around the R/G pixel (7,3), are subjected to the weighted addition at a ratio of 4:1:1:1:1, a G pixel (7,3) is obtained. In this case, only the G pixel components of the R/G pixels are used.

Similarly, for an R/G pixel (3,7), an R pixel (3,3), and a B pixel (7,5), the weighted addition in the cross direction centering on each of those pixels is also performed, and thus a G pixel (3,7), an R pixel (3,3), and a B pixel (7,5) are obtained.

The weighted addition processing as described above is repeated on pixels to be processed, and the output from the horizontal weighted addition circuit unit 251 (pixel array of S62) is changed into a pixel array of the Bayer array (S62, S63), and thus the weighted addition processing is terminated.

Similar to the Bayer output circuit unit 222 or the like of FIG. 7, the weighted addition circuit unit 252 outputs the pixel values of pixels arranged in the Bayer array to a circuit or the like in a subsequent stage (S64).

In other words, in the signal processing circuit unit 105 of FIG. 10, after the horizontal weighted addition circuit unit 251 performs the weighted addition processing in the horizontal direction (S61), the weighted addition circuit unit 252 performs the weighted addition processing in the cross direction (S62) such that the input pixels are arranged in the Bayer array. Then, the weighted addition circuit unit 252 outputs the pixel values of pixels arranged in the Bayer array to a circuit or the like in a subsequent stage (S63, S64).

Hereinabove, the sixth embodiment has been described. In the sixth embodiment, the weighted addition processing in the horizontal direction and the cross direction is performed not using the W pixels having luminance components as main components but using only the R pixels, G pixels, and B pixels corresponding to the respective color components of the plurality of color components, and the pixel values of the pixels arranged in the Bayer array are output. As a result, a captured image obtained from the output pixel values can achieve an image quality in which a false color is suppressed.

Further, in the weighted addition processing of FIG. 10, adjacent R, G, and B pixels are subjected to the weighted addition processing in the cross direction, and thus a false color is reduced.

<Imaging Processing>

Figure 11:
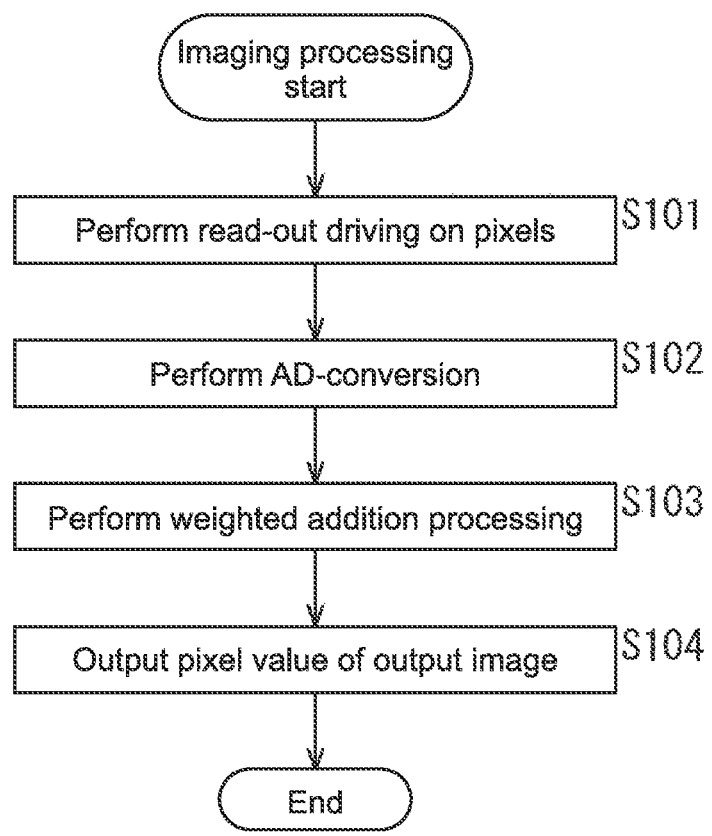
FIG. 11 is a flowchart for describing imaging processing.

Next, imaging processing executed by the CMOS image sensor 100 will be described with reference to the flowchart of FIG. 11.

In Step S101, the pixel drive unit 103 performs read-out driving on pixels arranged in the pixel array unit 102 by a predetermined method. As the read-out driving method for pixels, any one of the read-out driving of pixels of FIGS. 2, 4, and 6 is used.

It should be noted that in the read-out driving of pixels described above, the example in which only the R pixels, the G pixels, and the B pixels in the pixel sharing are read out has been described, but in the case where luminance information are acquired from the W pixels, the W pixels are read out. Whether the W pixels are read out or not is switched in accordance with a mode, for example.

In Step S102, the AD conversion unit 104 AD-converts the analog pixel signals, which are input from the pixels arranged in the pixel array unit 102 via the vertical signal lines. Here, as shown in FIG. 2 and the like, the AD conversion is performed by the North ADC or the South ADC connected for each pixel sharing.

In Step S103, the signal processing circuit unit 105 uses digital pixel signals from the AD conversion unit 104 to execute predetermined weighted addition processing.

In the weighted addition processing, however, the weighted addition processing in at least one of the horizontal direction, the vertical direction, and the oblique direction is performed not using the W pixels having luminance components as main components but using only the R pixels, G pixels, and B pixels corresponding to respective color components of the plurality of color components, and the image of the Bayer array is obtained as an output image.

Specifically, any one type of the weighted addition processing in the first to sixth embodiments described above is executed. Further, those types of weighted addition processing can be switched in accordance with a mode, for example. This allows appropriate signal processing to be performed in accordance with the image capturing state.

In Step S104, the signal processing circuit unit 105 outputs the pixel values of the output image acquired by the predetermined weighted addition processing to a circuit or the like in a subsequent stage. Here, the pixel values of the pixels arranged in the Bayer array are output.

Hereinabove, the imaging processing has been described.

<Configuration Example of Electronic Apparatus to which Embodiment of Present Disclosure is Applied>

Figure 12:
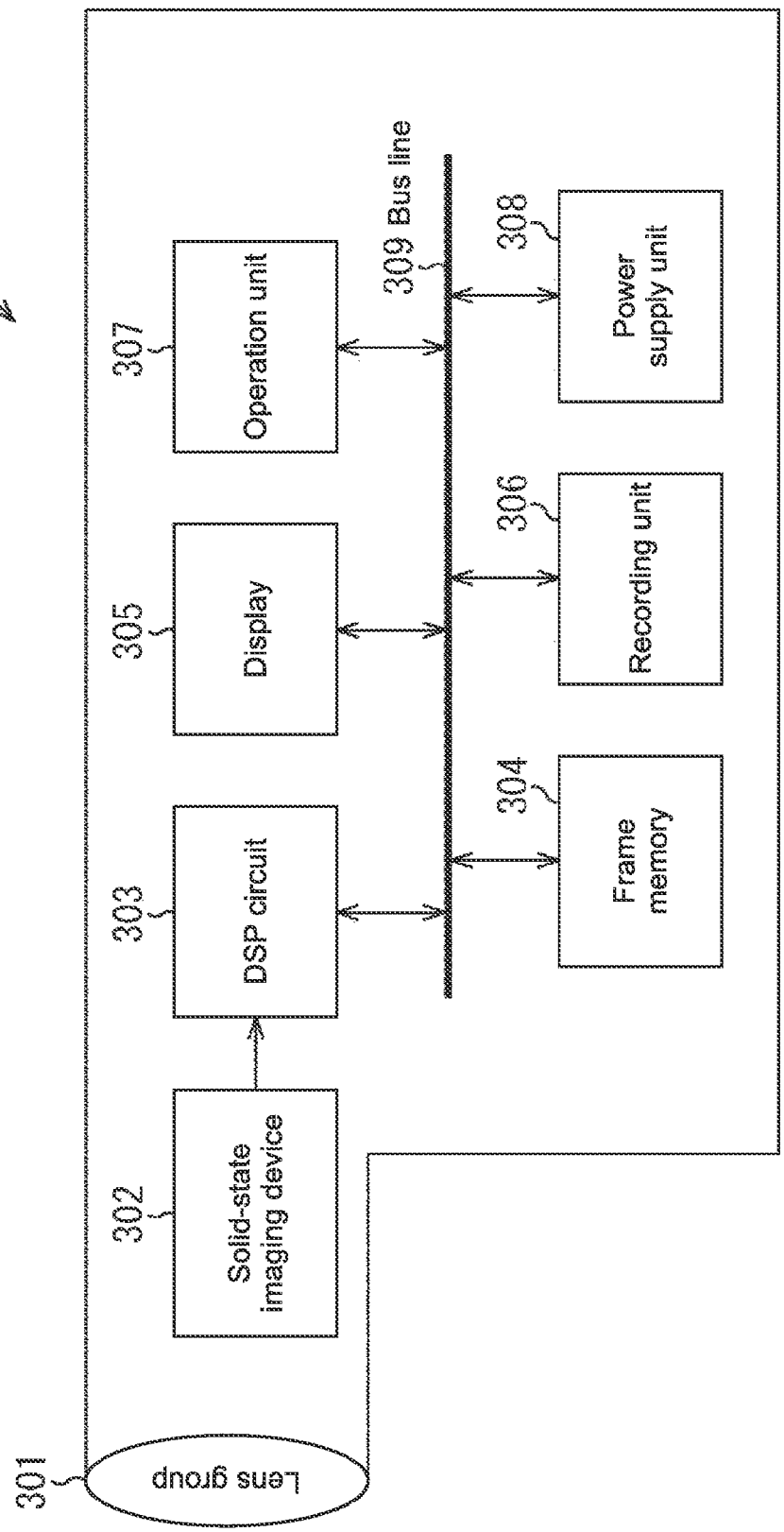
FIG. 12 is a diagram of an electronic apparatus to which an embodiment of the present disclosure is applied.

FIG. 12 is a diagram showing a configuration example of an electronic apparatus to which an embodiment of the present disclosure is applied.

An electronic apparatus 300 of FIG. 12 includes an optical unit 301 constituted of a lens group and the like, a solid-state imaging device 302 constituted of the CMOS image sensor 100 according to each of the embodiments described above, and a DSP (Digital Signal Processing) circuit 303 serving as a camera signal processing circuit. Further, the electronic apparatus 300 includes a frame memory 304, a display 305, a recording unit 306, an operation unit 307, and a power supply unit 308. The DSP circuit 303, the frame memory 304, the display 305, the recording unit 306, the operation unit 307, and the power supply unit 308 are connected to one another via a bus line 309.

The optical unit 301 takes in incident light coming from a subject, i.e., an image light, and forms an image on an imaging surface of the solid-state imaging device 302. The solid-state imaging device 302 converts the amount of incident light, with which the image is formed on the imaging surface by the optical unit 301, into an electrical signal on a pixel-by-pixel basis. The solid-state imaging device 302 subsequently outputs the electrical signal as a pixel signal. A solid-state imaging device such as the CMOS image sensor 100 according to each of the embodiments described above can be used as the solid-state imaging device 302.

The display 305 is, for example, formed of a panel display such as a liquid crystal panel or an organic EL (Electro Luminescence) panel and displays moving images or still images captured by the solid-state imaging device 302. The recording unit 306 records the moving images or still images captured by the solid-state imaging device 302 on a recording medium such as a flash memory.

The operation unit 307 issues operation commands on various functions of the electronic apparatus 300 under the operation of a user. The power supply unit 308 supplies various types of power, which serve as operation power of the DSP circuit 303, the frame memory 304, the display 305, the recording unit 306, and the operation unit 307, to those supply targets as appropriate.

Using the CMOS image sensor 100 according to each of the embodiments described above as the solid-state imaging device 302 allows noise reduction processing including kTC noise, and thus a high S/N ratio can be ensured. Consequently, also in the electronic apparatus 300 such as a digital still camera, a digital video camera, and a camera module for mobile devices including a mobile phone and the like, a captured image can achieve a high image quality.

Further, in the embodiments described above, the case where the present disclosure is applied to the CMOS image sensor has been described as an example. The CMOS image sensor is formed of unit pixels that detect, as a physical amount, signal charge corresponding to the amount of visible light and are arranged in a matrix. However, the present disclosure is not limited to the application to the CMOS image sensor and is applicable to all column-system solid-state imaging devices formed of column processing units arranged for each of pixel columns of the pixel array unit.

Further, the present disclosure is not limited to be applied to the solid-state imaging device that detects the distribution of the amount of incident visible light and captures the distribution as an image. The present disclosure is applicable to a solid-state imaging device that captures the distribution of the incident light amount of infrared rays or X rays or the distribution of particles or the like as an image, or applicable to, in a broader sense, all solid-state imaging devices (physical quantity distribution detecting devices) including a fingerprint detection sensor that detects the distribution of another physical quantity such as a pressure and an electrostatic capacitance and captures an image of the distribution.

It should be noted that the embodiments of the present disclosure are not limited to the embodiments described above and can be variously modified without departing from the gist of the present disclosure.

Further, the present disclosure can have the following configurations.

(1) A solid-state imaging device, including:
a pixel array unit including first pixels and second pixels, the first pixels corresponding to respective color components of a plurality of color components, the second pixels having luminance components as main components, the first pixels and the second pixels being arranged regularly in a matrix;
a pixel drive unit configured to drive the pixels arranged in the pixel array unit; and
a signal processing unit configured to execute predetermined weighted addition processing and calculate a pixel value of an output image by using only pixel information acquired from the first pixels.

(2) The solid-state imaging device according to (1), in which
the signal processing unit is configured to execute the weighted addition processing in at least one of a horizontal direction, a vertical direction, and an oblique direction.

(3) The solid-state imaging device according to (2) or (3), in which
the output image includes an image of a Bayer array, and
the signal processing unit is configured to execute the weighted addition processing, to acquire a pixel value of the image of the Bayer array.

(4) The solid-state imaging device according to any one of (1) to (3), in which
the pixel array unit
includes the second pixels arranged in a checkered pattern and the first pixels arranged in the remaining part, and includes a floating diffusion area that is shared in a predetermined pixel unit including a plurality of pixels, the plurality of pixels each including a photoelectric conversion element, and that holds charge accumulated by each of the photoelectric conversion elements of the pixels to be read out as a signal.

(5) The solid-state imaging device according to (4), in which the pixel drive unit is configured to cause the shared floating diffusion area to hold the charge acquired from the first pixels having the same color component in a pixel sharing and simultaneously read out the charge.

(6) The solid-state imaging device according to (4), in which the pixel drive unit is configured to read out the charge acquired from all of the first pixels in a pixel sharing.

(7) The solid-state imaging device according to (4), further including
an analog-to-digital conversion unit configured to analog-to-digital-convert the pixel information acquired from the first pixels in a pixel sharing.

(8) The solid-state imaging device according to any one of (1) to (7), in which
the first pixels include pixels corresponding to any one of color components of red (R), green (G), and blue (B), and
the second pixels include white (W) pixels.

(9) A driving method for a solid-state imaging device including
a pixel array unit including first pixels and second pixels, the first pixels corresponding to respective color components of a plurality of color components, the second pixels having luminance components as main components, the first pixels and the second pixels being arranged regularly in a matrix,
a pixel drive unit configured to drive the pixels arranged in the pixel array unit, and
a signal processing unit configured to execute predetermined weighted addition processing and calculate a pixel value of an output image by using only pixel information acquired from the first pixels,
the driving method including
driving, by the pixel drive unit, the pixels to share a floating diffusion area in a predetermined pixel unit including a plurality of pixels, the plurality of pixels each including a photoelectric conversion element, the floating diffusion area holding charge accumulated by each of the photoelectric conversion elements of the pixels to be read out as a signal.

(10) An electronic apparatus, including
a solid-state imaging device including
a pixel array unit including first pixels and second pixels, the first pixels corresponding to respective color components of a plurality of color components, the second pixels having luminance components as main components, the first pixels and the second pixels being arranged regularly in a matrix,
a pixel drive unit configured to drive the pixels arranged in the pixel array unit, and
a signal processing unit configured to execute predetermined weighted addition processing and calculate a pixel value of an output image by using only pixel information acquired from the first pixels.

It should be understood by those skilled in the art that various modifications, combinations, sub-combinations and alterations may occur depending on design requirements and other factors insofar as they are within the scope of the appended claims or the equivalents thereof.

What is claimed is:

1. A solid-state imaging device, comprising:
a pixel array unit including first pixels and second pixels, the first pixels corresponding to respective color components of a plurality of color components, the second pixels having luminance components as main components, the first pixels and the second pixels being arranged regularly in a matrix;
a pixel drive circuitry configured to drive the pixels arranged in the pixel array unit; and
a signal processing circuitry configured to execute predetermined weighted addition processing and calculate a pixel value of an output image by using only pixel information acquired from the first pixels, the weighted addition processing being in at least one of a horizontal direction, a vertical direction and an oblique direction,
wherein the output image includes an image of a Bayer array,
the signal processing circuitry is configured to execute the weighted addition processing to acquire a pixel value of the image of the Bayer array, and
the pixel array unit includes the second pixels arranged in a checkered pattern and the first pixels arranged in the remaining part, and includes a floating diffusion area that is shared in a predetermined pixel unit including a plurality of pixels, the plurality of pixels each including a photoelectric conversion element, and that holds charge accumulated by each of the photoelectric conversion elements of the pixels to be read out as a signal.

2. The solid-state imaging device according to claim 1, wherein
the pixel drive circuitry is configured to cause the shared floating diffusion area to hold the charge acquired from the first pixels having the same color component in a pixel sharing and simultaneously read out the charge.

3. The solid-state imaging device according to claim 1, wherein
the pixel drive circuitry is configured to read out the charge acquired from all of the first pixels in a pixel sharing.

4. The solid-state imaging device according to claim 1, further comprising
an analog-to-digital converter configured to analog-to-digital-convert the pixel information acquired from the first pixels in a pixel sharing.

5. The solid-state imaging device according to claim 1, wherein
the first pixels include pixels corresponding to any one of color components of red (R), green (G), and blue (B), and
the second pixels include white (W) pixels.

6. A driving method for a solid-state imaging device including a pixel array unit including first pixels and second pixels, the first pixels corresponding to respective color components of a plurality of color components, the second pixels having luminance components as main components, the first pixels and the second pixels being arranged regularly in a matrix, a pixel drive circuitry configured to drive the pixels arranged in the pixel array unit, and a signal processing circuitry configured to execute predetermined weighted addition processing and calculate a pixel value of an output image by using only pixel information acquired from the first pixels, the driving method comprising:
driving, by the pixel drive circuitry, the pixels to share a floating diffusion area in a predetermined pixel unit including a plurality of pixels, the plurality of pixels each including a photoelectric conversion element, the floating diffusion area holding charge accumulated by each of the photoelectric conversion elements of the pixels to be read out as a signal.

7. The method according to claim 6, further comprising:
causing, by the pixel drive circuitry, the shared floating diffusion area to hold the charge acquired from the first pixels having the same color component in a pixel sharing and simultaneously read out the charge.

8. The method according to claim 6, further comprising: reading out, by the pixel drive circuitry, the charge acquired from all of the first pixels in a pixel sharing.

9. The method according to claim 6, further comprising: analog-to-digital converting the pixel information acquired from the first pixels in a pixel sharing.

10. The method according to claim 6, wherein the first pixels include pixels corresponding to any one of color components of red (R), green (G), and blue (B), and the second pixels include white (W) pixels.

11. An electronic apparatus, comprising:
a solid-state imaging device including
a pixel array unit including first pixels and second pixels, the first pixels corresponding to respective color components of a plurality of color components, the second pixels having luminance components as main components, the first pixels and the second pixels being arranged regularly in a matrix,
a pixel drive circuitry configured to drive the pixels arranged in the pixel array unit, and
a signal processing circuitry configured to execute predetermined weighted addition processing and calculate a pixel value of an output image by using only pixel information acquired from the first pixels, the weighted addition processing being in at least one of a horizontal direction, a vertical direction, and an oblique direction,
wherein the output image includes an image of a Bayer array,
the signal processing circuitry is configured to execute the weighted addition processing to acquire a pixel value of the image of the Bayer array, and
the pixel array unit includes the second pixels arranged in a checkered pattern and the first pixels arranged in the remaining part, and includes a floating diffusion area that is shared in a predetermined pixel unit including a plurality of pixels, the plurality of pixels each including a photoelectric conversion element, and that holds charge accumulated by each of the photoelectric conversion elements of the pixels to be read out as a signal.

12. The electronic apparatus according to claim 11, wherein the pixel drive circuitry is configured to cause the shared floating diffusion area to hold the charge acquired from the first pixels having the same color component in a pixel sharing and simultaneously read out the charge.

13. The electronic apparatus according to claim 11, wherein the pixel drive circuitry is configured to read out the charge acquired from all of the first pixels in a pixel sharing.

14. The electronic apparatus according to claim 11, further comprising: an analog-to-digital converter configured to analog-to-digital-convert the pixel information acquired from the first pixels in a pixel sharing.

15. The electronic apparatus according to claim 11, wherein the first pixels include pixels corresponding to any one of color components of red (R), green (G), and blue (B), and the second pixels include white (W) pixels.

* * * * *